United States Patent [19]

Lehner et al.

[11] 4,426,982
[45] Jan. 24, 1984

[54] PROCESS FOR CONTROLLING THE BEGINNING OF DELIVERY OF A FUEL INJECTION PUMP AND DEVICE FOR PERFORMING SAID PROCESS

[75] Inventors: Gerhard Lehner; Theodor Stipek, both of Hallein, Austria

[73] Assignee: Friedmann & Maier Aktiengesellschaft, Hallein, Austria

[21] Appl. No.: 307,939

[22] Filed: Oct. 2, 1981

[30] Foreign Application Priority Data

Oct. 8, 1980 [AT] Austria .................................. 4999/80

[51] Int. Cl.$^3$ ............................................. F02M 59/20
[52] U.S. Cl. .................................. 123/501; 123/357; 123/383
[58] Field of Search ............... 123/501, 502, 357, 383, 123/494, 564, 406; 60/600, 601, 611

[56] References Cited

U.S. PATENT DOCUMENTS

| | | | |
|---|---|---|---|
| 1,718,586 | 6/1929 | Schmidt | 123/501 |
| 2,270,410 | 1/1942 | Camner | 123/501 |
| 3,742,925 | 7/1973 | Gordon, Jr. et al. | 123/501 |
| 4,342,302 | 8/1982 | Straubel et al. | 123/502 |

FOREIGN PATENT DOCUMENTS 862492  2/1971  Canada .................................. 123/501

Primary Examiner—Charles J. Myhre
Assistant Examiner—Magdalen Moy
Attorney, Agent, or Firm—Cushman, Darby & Cushman

[57] ABSTRACT

In a process for controlling the beginning of delivery of a fuel injection pump for internal combustion engines having fuel injection, particularly Diesel engines, in dependence on the torque and under consideration of immediately measurable operation parameters, at least the revolution speed. The torque is determined from the intake boost pressure generated by a turbocharger and optionally from that amount of air which is blown off at increasing revolution speed above a certain intake boost pressure.

A device for performing said process comprises a processor for performing at least one calculating operation provided with a store for storing the program to be executed, sensors transmitting signals to the processor representative of operation parameters of the injection-type internal combustion engine, and actuating means for controlling the beginning of fuel delivery of the fuel injection pump being connected with the processor. For determining the torque delivered by the engine there is provided a sensor for the intake boost pressure and a further sensor designed as pressure transducer for the differential pressure at a restriction for supplying to the processor a value corresponding to the air blown off.

7 Claims, 10 Drawing Figures

PROCESS FOR CONTROLLING THE BEGINNING OF DELIVERY OF A FUEL INJECTION PUMP AND DEVICE FOR PERFORMING SAID PROCESS

The invention refers to a process for controlling the beginning of delivery of a fuel injection pump for fuel injection operated internal combustion engines, particularly for the fuel injection into a Diesel engine, in which process operation parameters such as revolution speed, intake pressure, temperature of the motor or the like are measured and the torque supplied by the motor is determined, whereupon the beginning of delivery of the fuel injection pump is adjusted in dependence on the torque determined and with consideration of at least the measured revolution speed. The invention further refers to a device for performing this process.

It is known that the emission of noxious substances of internal combustion engines can substantially be reduced by suitably selecting the ignition point of Otto carburetor engines and, respectively, the beginning of fuel injection operated internal combustion engines, particularly Diesel engines. Important operation parameters for relatively shifting this decisive point are the revolution speed and also the load, which is what Otto carburetor engines made use of for adjusting the ignition point by subjecting a spring-loaded diaphragm to the sub-atmospheric pressure prevailing within the manifold.

From the DE-OS No. 29 03 875 there has already become known a device for performing the initially mentioned process, in which device there is used for determining the load of the motor the position of the control rod of the fuel injection pump beside an electrical signal being proportional to the revolution speed, noting that a position signal transmitter is arranged on the control rod. The position of the control rod is, however, an only insufficient criterion for the actual load of the motor, particularly if the motor is subjected to pushed operation, and in addition the use of position signal transmitters in connection with the control rod requires an additional means for compensating the thermal extension of the control rod during operation. Particularly with motor vehicles, in which the motor is frequently subjected to pushed operation, the emission of noxious substances cannot be reduced to the required extent with this known device.

It is an object of the invention to provide a process of the type initially mentioned by which the emission of noxious substances and the fuel consumption of a fuel injection operated internal combustion engine, particularly of a Diesel engine, can be reduced in all operational conditions and, in particular, also during pushed operation of the motor. For solving this task, the invention essentially consists in that the torque is determined from the intake boost pressure generated by a turbocharger and optionally from that amount of air which is blown off with increasing revolution speed above a certain intake boost pressure. The intake boost pressure is measured to determine the load of the engine at a given moment which corresponds to the engine torque. In arrangements comprising a turbocharger designed for obtaining the maximum pressure only with the highest admissible revolution speed it is for determining the torque supplied by the motor sufficient to measure the intake boost pressure, noting that the measured value obtained corresponds to the actual conditions even if the motor is subjected to pushed operation. In arrangements comprising a turbocharger designed for a high pressure and thus for a high power of the internal combustion engine already at low rotation speeds, the maximum intake boost pressure generated by the turbocharger is already attained before attaining the maximum admissible rotation speed of the internal combustion engine. In such cases, an increasing amount of air is blown off above a certain rotation speed so that the amount of air blown off must additionally be determined for obtaining a correct information on the load condition of the motor. For adjusting the beginning of delivery of the fuel injection pump, the rotation speed of the motor is additionally taken into consideration in all cases. With this process one can do with simple and operation-safe sensors. By measuring the signal for the motor torque and by processing this measured quantity in a microprocessor, a controller output for adjusting the fuel injection point can be calculated, noting that such a load-dependent adjustment of the injection point results with a Diesel engine in a reduction of the emission of noxious substances and also in an improvement of the power characteristics and of the fuel consumption characteristics and further in a reduction of the thermal and mechanical stress of the constructional parts of the motor.

The fuel injection point must in a known manner be adjusted in dependence on the revolution speed of the motor and the use of a microprocessor provides the possibility to simultaneously transpose in a simple manner the influences of the speed of revolution of the motor and of the load torque into a common controller output for adjusting the fuel injection point. Adjustment of the fuel injection point can, in dependence on the construction of the fuel injection pump, be effected in different manner. In a construction, in which the fuel injection pump is actuated by a cam shaft via a rocker arm, the pivotal point can be shifted by actuating an eccentric, which results in shifting the injection point to an earlier or later moment. Adjustment of such eccentric can, for example, be hydraulically or electrically effected, for example by means of a stepping motor. A device for adjusting the beginning of delivery of fuel injection has, for example, become known from AT-PS 298 881. In this arrangement, a coupling sleeve is axially shifted whereby the two shafts connected by said sleeve and having an external gearing of different pitch are relatively rotated. Shifting of the coupling sleeve of this known arrangement can be effected, for example, by hydraulic means or electric means and in particular by means of a stepping motor. With fuel injection pumps having a separate control rod for adjusting the fuel injection point, a stepping motor can, for example, be directly and positively coupled with this control rod. A stepping motor could be actuated by the microprocessor without interposition of constructional parts. Hydraulically actuating the adjusting means for the injection point would require a corresponding transposition of a mechanical quantity into a hydraulic quantity. According to the invention, a plurality of signals, which are directly proportional to the load or are according to a simple law mathematically interrelated with the load, are suitable for being utilized in a microprocessor.

For determining the motor torque there are, according to the invention, preferably used measured values for the rotation speed and optionally for the exhaust gas temperature and/or the carbon monoxide content of the exhaust gases so that the required reduction of noxious substances can be obtained in a particularly exact manner. For measuring the amount of air blown off there can be used in a particularly simple manner the opening stroke of the exhaust valve so that also in this case one can do with simple sensors or transducers.

The inventive device for performing this process comprises sensors for operation parameters such as revolution speed, intake pressure, motor temperature or the like as well as at least one sensor for determining the torque supplied by the motor, said sensors being connected with a processor for performing at least one calculating operation and said processor comprising a store for storing the program to be executed, said device further comprising a control means for controlling the beginning of fuel delivery of the fuel injection pump and said actuating means being connected with the processor. The mentioned device is, according to the invention, essentially characterized in that a sensor for the intake boost pressure is provided and that a further sensor is designed as pressure sensor for the pressure difference generated at a restrictor and supplies to the processor a value for the amount of air blown off. The arrangement can in a simple manner be selected such that one sensor is designed as an electrically heated or cooled wire located within the air stream of exhaust air and supplying, based on the temperature reduction and, respectively the temperature change, to the processor a value corresponding to the amount of air blown off. In all cases, electrical signals are directly obtained and can be supplied to a microprocessor.

The control means comprising the microprocessor can be connected with a final control element for adjusting the beginning of the fuel supply, which final control element is formed of a hydraulic or pneumatic piston, an electric lifting magnet, an electric motor, an electric servo motor or an electric stepping motor. In view of the control means being supplied not only with a load-dependent signal but, as a rule, also with a signal corresponding to the speed of revolution, complicated interrelations are feasible with a common final control element of the mentioned type. In this case, the preferred mode of operation resides in recalling a characterizing value for the variation of the fuel injection, which characterizing value has been stored within the control means on the basis of the signals representing the speed of revolution and the load, and coordinating this characterizing value to the final control element.

In the following, the invention is further described with reference to the drawing in which is shown a device for adjusting the injection point in dependence on the load and on the revolution speed, adjustment of the injection point being effected by differential rotation movement between the pump drive and the cam shaft of the pump.

FIGS. 1 and 2 show the linear dependency between injection point and revolution speed for known control devices being independent of the torque of the motor. The curves representing adjustment of the injection point are thus, within a performance graph of the motor, straight lines above the revolution speed.

FIGS. 3 and 4 show the speed-dependent and load-dependent adjustments of the ignition point as they are feasible according to the invention. In FIGS. 1 to 4 "SV" indicates fuel timing in degrees of the cam shaft angle. FIGS. 5 and 6 show in a section a device for changing the angle of rotation between the pump drive and the cam shaft of the pump, FIG. 5 showing a section alone line V-V of FIG. 6.

Figure 1:
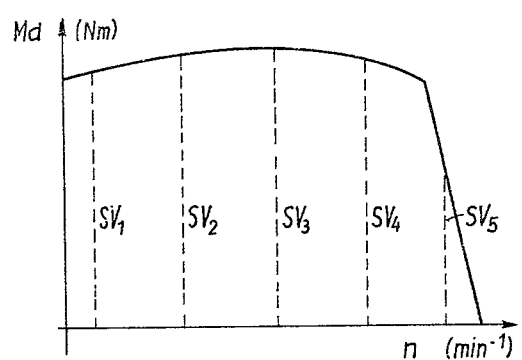
Figure 2:
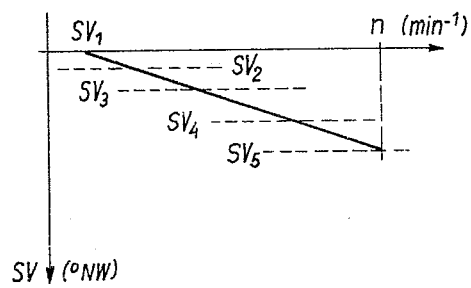

The abscissa in FIG. 1 represents the revolution speed of the motor as expressed in numbers of revolutions per minute and the ordinate represents the motor torque in Nm. As can be seen in FIG. 2, adjustment of the injection point, as plotted for different motor speeds on the negative portion of the ordinate as cam shaft angle as measured in degrees prior to the upper deadcenter of the piston of the internal combustion engine, results in a straight line which is with usual control equipment independent of the torque of the motor. Deviating from such usual injection point graphs, graphs analogous to FIGS. 1 and 2 are shown in FIGS. 3 and 4 for different motor torques, noting that any desired speed-dependent and load-dependent adjustments of the injection point shall be possible.

Figure 3:
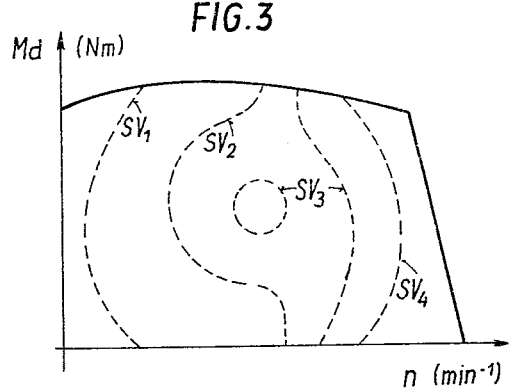
Figure 4:
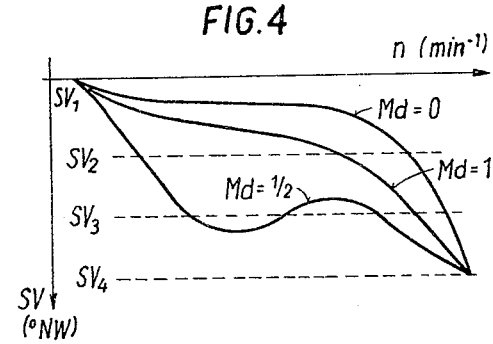
Figure 5:
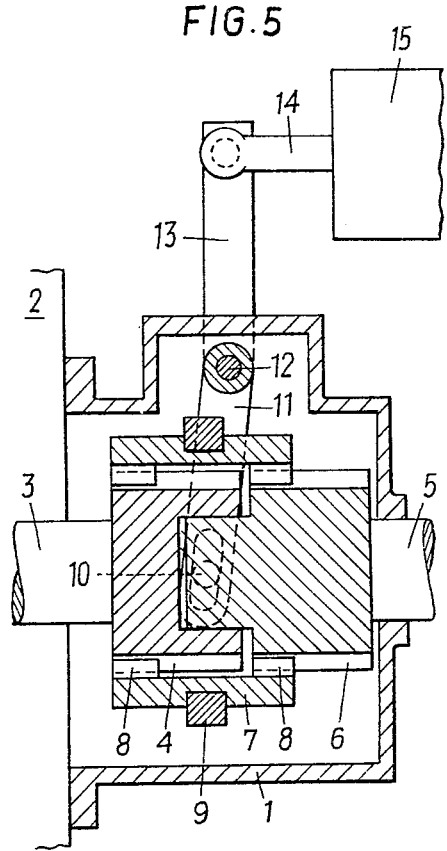
Figure 6:
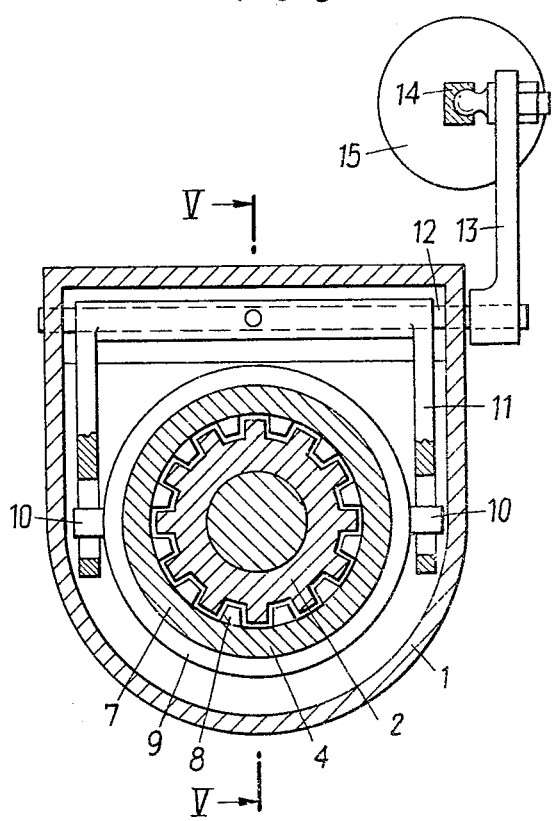

The possibility for obtaining the characteristics shown in FIGS. 3 and 4 is, for example, existing in a construction of the adjusting device for the injection point according to FIGS. 5 and 6, noting that the final control element is actuated by a control means. In FIGS. 5 and 6 1 designates a housing which is, for example, flanged to the injection pump housing 2. A shaft 3 being provided with an external gear 4 is arranged within the housing 1. Within the shaft 3 and within the housing 1 a second shaft 5, equally provided with an external gear 6, is supported. A sliding sleeve 7 comprising an internal gear 8 is slidingly movable in longitudinal direction by means of a sliding ring 9. In view of the combination of the helical gearings and, respectively, radial gearings and helical gearings, movement of the sliding sleeve 7 in longitudinal direction results in moving the shafts 3 and 5 one relative to the other. Bolts 10 are mounted on the sliding ring 9 and actuated by an external lever 13 via a rod 11 pivotable on a shaft 10. In dependence on the position of the external lever 13 there results an exactly defined position of the sliding sleeve 7 and thus also a corresponding angular position between the shafts 3 and 5. In view of the rotational difference between the shafts 3 and 5 being proportional to the change of the injection point, any desired change of the injection point can be obtained by means of the external lever 13. The external lever 13 is connected with a servo motor 15 by means of a rod 14. The servo motor controls the position of the sliding sleeve 7 and thus the change of the fuel injection in dependence on the motor load and the motor torque. The servomotor 15 can work according to the hydraulic, pneumatic or electric principle. This has as a premise that the servo motor 15 can follow any occurrying changes in load and speed of the internal combustion engine.

Figure 7:
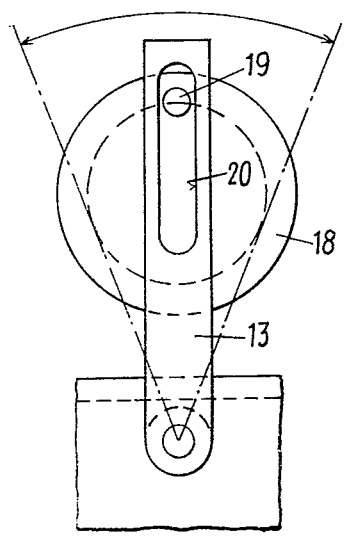
FIGS. 7 and 8 show a final control element designed as stepping motor.
Figure 8:
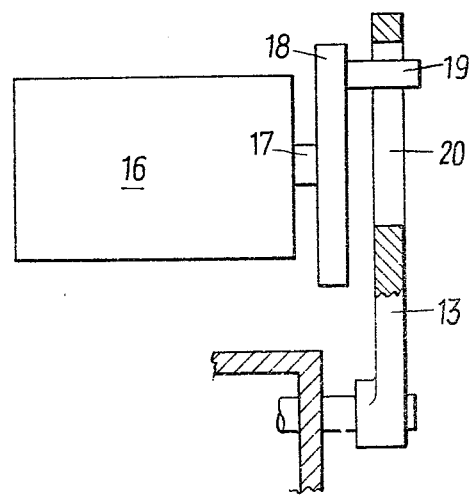

FIGS. 7 and 8 show an embodiment comprising a stepping motor 16. The stepping motor has a high stepping frequency and a high accuracy. A disc 18 having a bolt 19 thereon is mounted on the shaft 17. Said bolt 19 engages an elongated slot 20 provided in the external lever 13. In dependence on the angular position of the stepping motor, the external lever 13 is actuated and the required adjustment of the injection point is achieved.

Figure 9:
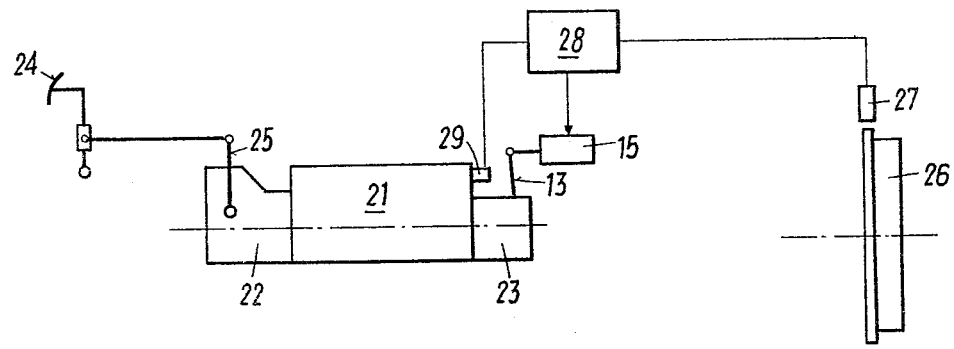
FIG. 9 shows schematically the overall arrangement for a fuel injection system.

FIG. 9 schematically shows the total arrangement for a usual fuel injection system. The invention is, however, not compulsorily associated with such a fuel injection system but is conceived for any desired fuel injection system. A controller 22 and the timing device or adjusting device 23 for the fuel injection is mounted to the pump 21. The accelerator pedal 24 is actuating the external lever 25 of the controller and by actuating this pedal the required motor speed and, respectively, motor load is preselected. A sensor 27 measuring the motor speed or revolution speed is arranged on the fly wheel 26 of the internal combustion engine. This revolution speed is transmitted to the control means 28. Simultaneously, the motor torque is determined by a further sensor 29 which measures the intake boost pressure. This sensor is schematically indicated in FIG. 9. The signal of the sensor 29, which signal is proportional to the load torque, is also transmitted to the control means 28. Within the control means 28 there are stored the nominal characteristic values for the adjustment of the injection point. By measuring the motor torque and the motor speed, the load point in the motor performance graph, and therewith also the required adjustment of the injection point, is exactly defined. The control means 28 actuates the servo motor 15 in correspondance with the motor load point and the servo motor 15 changes the injection point to the desired value via the external lever 13.

Figure 10:
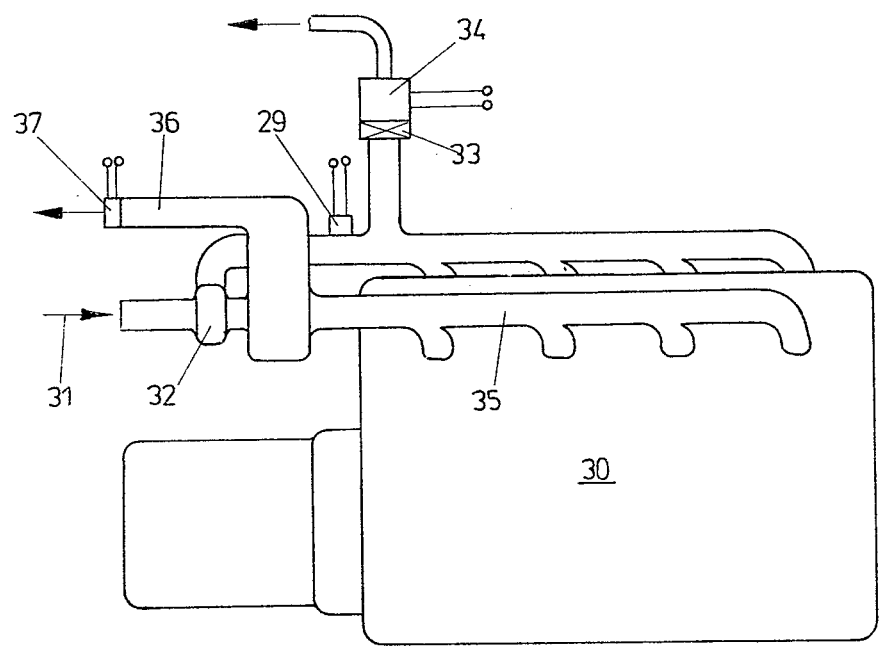
FIG. 10 schematically represents the arrangement of the sensors on a Diesel-engine.

In FIG. 10, the motor is designated 30. Air is sucked at 31 and is compressed by a turbocharger 32. The intake boost pressure is measured by a sensor 29, noting that in the embodiment shown an exhaust valve 33 is provided via which part of the air is blown off with increasing revolution speed. A sensor 34 is arranged on the exhaust valve 33 for determining the amount of air blown off.

The exhaust gases coming from the motor are passed via the exhaust manifold 35 and the turbocharger into the exhaust conduit 36, noting that a further sensor 37 is provided by means of which the carbon monoxide content of the exhaust gases and, respectively, the temperature of the exhaust gases can be determined. The signals coming from the sensors 29, 34 and 37 can directly be supplied to the microprocessor within the control means 28, and in this manner an exact control signal for changing the injection point can be derived which control signal is suitable for obtaining particularly favourable values with respect to emission of noxious substances and fuel consumption.

A further conceivable embodiment consists in obtaining any arbitrary, load-dependent and speed-dependent adjustment of the ignition point by means of a load-dependent actuation of the external lever of the device described in AT-PS 298 881. The speed-dependent adjustment of the injection point can be effected in dependence on the tachometer, for example shown in AT-PS 298 881. When using a microprocessor, the values for the motor speed and the values for load-dependent signals can be combined in any desired manner, so that the special requirements of a given internal combustion engine can be better considered.

What is claimed is:

1. A method for controlling the beginning of supply by a fuel injection pump according to the torque and speed of a turbocharged internal combustion engine, said turbocharger being provided with an exhaust valve to release air in excess of a predetermined intake boost pressure, the torque being determined from the intake boost pressure generated by the turbocharger and the amount of air released from said exhaust valve.

2. The method according to claim 1 wherein the torque is further determined by measuring at least one of the parameters including the exhaust gas temperature and carbon monoxide content of the exhaust gases.

3. The method according to claim 1 wherein the fuel timing is further controlled by the engine temprature.

4. The method according to claim 1 wherein the amount of air released from the turbocharger is determined by a pressure sensor within its exhaust channel.

5. The method according to claim 1 wherein the amount of air released from the turbocharger is determined by a thermal-type flow meter.

6. A device for controlling the beginning supply by a fuel injection pump in an internal combustion engine including a turbocharger of the type having an exhaust engine including a turbocharger of the type having an exhaust valve to release the air pressure in excess of a predetermined intake boost pressure at specified engine speeds, comprising sensing means to measure the intake boost pressure, the pressure at the turbocharger exhaust valve which corresponds to the amount of air exhausted and the engine speed, said sensing means being connected to a programmable microprocessor performing at least one calculating operation, the device further comprising a means controlled by said microprocessor for controlling the beginning of fuel delivery by the fuel injector pump.

7. The device according to claim 4 wherein the sensor for determining the amount of air exhausted comprises an electrically heated member situated within the exhaust air flow providing to the microprocessor a signal indicating the temperature change occurring between predetermined time intervals.

* * * * *